US009723591B2

United States Patent
Rohit et al.

(10) Patent No.: US 9,723,591 B2
(45) Date of Patent: *Aug. 1, 2017

(54) INDEPENDENT SIGNALLING METHOD FOR BEARER MANAGEMENT

(71) Applicant: Tejas Networks Limited, Bangalore (IN)

(72) Inventors: Kumar Rohit, Bangalore (IN); R C Sanil, Bangalore (IN); Kumar M Vinod, Bangalore (IN)

(73) Assignee: TEJAS NETWORKS LTD., Bangalore, Karnataka (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,744

(22) Filed: Mar. 29, 2013

(65) Prior Publication Data

US 2013/0258942 A1 Oct. 3, 2013

(30) Foreign Application Priority Data

Mar. 30, 2012 (IN) .......................... 1253/CHE/2012

(51) Int. Cl.
*H04W 4/00* (2009.01)
*H04W 72/04* (2009.01)
*H04L 29/08* (2006.01)

(52) U.S. Cl.
CPC ............ *H04W 72/04* (2013.01); *H04L 67/14* (2013.01)

(58) Field of Classification Search
CPC ................................ H04W 72/04; H04L 67/14
See application file for complete search history.

(56) References Cited

U.S. PATENT DOCUMENTS

2011/0044249 A1* 2/2011 Wu et al. ........................ 370/328
2011/0080891 A1* 4/2011 Cai et al. ........................ 370/331
(Continued)

OTHER PUBLICATIONS

3GPP Organizational Partners, 3GPP TR 36.806 V9.0.0, "Technical Specification Group Radio Access Network; Evolved Universal Terrestrial Radio Access (E-UTRA); Relay architectures for E-UTRA (LTE-Advanced)". Mar. 2010, pp. 1-34, Release 9, 3GPP Organizational Partners, Valbonne, France.

*Primary Examiner* — Clemence Han
(74) *Attorney, Agent, or Firm* — Prakash Nama; Global IP Services, PLLC

(57) ABSTRACT

Independent signalling method for bearer management in a communication network with transporting bearer resource request message of both the UE and RN via Base station to managing entity of RN within EPC, as a signalling message over uplink channel referred to as 'Union of Resource Request (UR Request)' message. The bearer resource response message referred to as 'Independent Admission Response (IA Response)' from one of the management entity of EPE or management entities of UE and RN within EPC are transported as a signalling message to Evolved Packet Edge (EPE) via Base station over the downlink channel. This manages bearer setup signalling as a single loop, by transportation of 'UR Request' signalling message and receiving one "Independent Admission Response" signalling message over uplink and downlink channels respectively. EPE is a conglomeration of network nodes comprising of UEs, RNs and all other network nodes that communicate over EPC via Base station.

14 Claims, 5 Drawing Sheets

(56) References Cited

U.S. PATENT DOCUMENTS

2011/0128908 A1* 6/2011 Lee et al. .................... 370/328
2012/0114021 A1* 5/2012 Chung et al. ................ 375/211
2013/0195015 A1* 8/2013 Takahashi et al. ........... 370/328
2013/0203381 A1* 8/2013 Takahashi et al. ........... 455/410
2014/0003329 A1* 1/2014 Chen ............................ 370/315

* cited by examiner

INDEPENDENT SIGNALLING METHOD FOR BEARER MANAGEMENT

FIELD OF THE INVENTION

The present disclosure relates to bearer management in a wireless communication network. In particular, the invention relates to transport of signalling messages on the interface between a relay node and another node in a mobile communication network.

BACKGROUND

In order to provide better qualities of service and wider communication ranges between wireless nodes, the concept of relay station has been introduced in network systems. The purpose of deploying relay station or Relay Node (RN) in network system is to extend the serving coverage of base station; hence, user equipment (UE) which is not within the communication coverage of base station can access the services provided by relay node as well via base station.

Wireless network architecture as defined by 3GPP introduces wireless relay node (RN) entity to extend the coverage of base station (evolved Node B or eNodeB or eNB). A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

The Relay Node (RN) forms an independent physical cell. From a user equipment (UE) perspective, the RN is seen as a usual base station. The RN is connected via a wireless link to the base station. The relay node architecture deployment foresees that a RN emulates a base station for the UE, which means that the UE would see the RN as a usual base station. From the network side, the RN is seen as a usual UE by the base station. The base station or eNB to which the RN is connected, is called Donor-eNB (DeNB) hereinafter referred to as Base station or eNB and operates as a usual base station. The deployment of RN in the 3GPP network architecture is described in 3GPP Technical Specification 36.806; "Relay architectures for E-UTRA (LTE-Advanced)".

In order for the user equipment to receive a service from the network, it needs to establish connectivity via base station, by initiating Non-Access Stratum (NAS) signalling messages with network nodes like Mobility Management Entity (MME) serving the UE. Consequential signalling messages are exchanged between network nodes to allocate bearer resources for UE and RN to service the UE request. The above bearer management procedure can be initiated by UE or the Evolved Packet Core (EPC in terms of 3GPP LTE) or simply the communication network. Similar procedures are followed for managing existing bearers. The managing functions include creating new entry, updating and deleting.

Thus, whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service and as well as backhaul bandwidth is wasted or underutilized. Therefore, there is a need for a bearer management to optimize radio and backhaul resources by effectively setting-up the bearers.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for facilitating bearer management in a communication network optimizing exchange of signalling communication in managing bearers for UE and RN.

An aspect of the invention provides for a method of managing bearer signalling in a communication network, by transporting "Union of Resource Request" (UR Request) signalling message from Evolved Packet Edge (EPE) entities to managing entities of RN via Base station and receiving "Independent Admission Response" (IA Response) signalling message for the transported UR Request from the management entity of EPE by Base station, wherein the said management entity serves/manages all the entities in the EPE. EPE is a conglomeration of network nodes comprising of user equipment, relay nodes and all other network nodes that communicate with EPC via Base station. Network nodes in the EPE may establish connectivity external to EPC like Internet or PSTN (Public Switch Telephone Network).

Another aspect relates to receiving "Independent Admission Response" (IA Response) signalling message for the transported UR Request from management entities of EPE by the Base station, wherein at least one of the said management entities are not serving/managing the same entities in the EPE.

Another aspect relates to network nodes like RN, Base station, MME_RN and MME_UE and systems facilitating the above method of managing bearers each comprising of at least a receiver, for receiving the said messages, processors for executing the functions, transmitter for transmitting messages, a memory for storing information and retaining instructions for executing functions associated with the above methods.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

Figure 1:
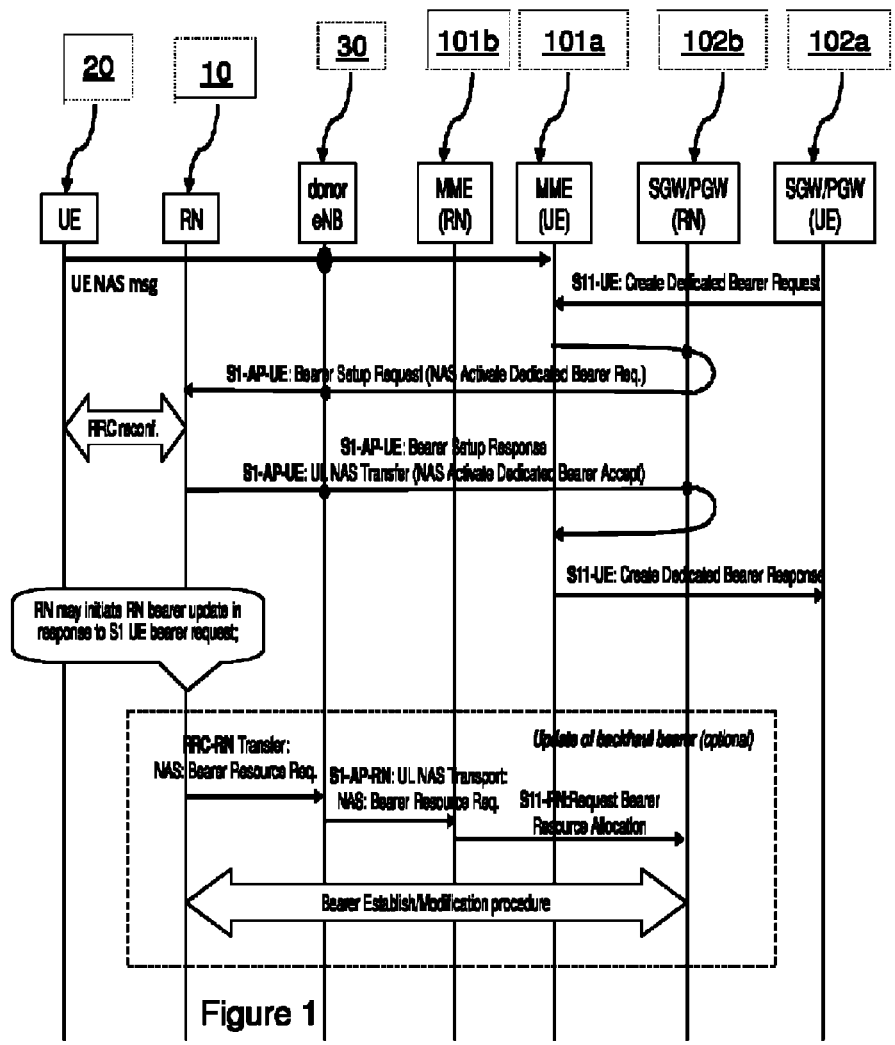
FIG. 1 is an illustration of existing bearer establishment procedure for user equipments (UE) and relay node (RN) as specified in 3GPP LTE (A) network architectures.

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. The terms, component, module, system, and the like are intended to refer to an entity or entities within a communication network node comprising of; hardware, software, a combination of hardware and software. For eg., a component may be, but not limited to being, a process running on a processor, a processor, an integrated circuit, or a computer. Both an application running on a computing device and the computing device can be a component. A component may be localized on one computer and/or distributed between two or more computers. The components may communicate by way of local and/or remote processes.

Those skilled in the art will understand that the principles of the present disclosure may be implemented in any suitably arranged systems. The terms used to describe various embodiments are exemplary. It should be understood that these are provided to merely aid the understanding of the description, and that their use and definitions in no way limit the scope of the invention.

The present invention and its embodiments are mainly described in relation to 3GPP specifications and standards (LTE-Advanced) for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

In particular, embodiments of the present invention may be applicable in any relay-enhanced (cellular) system with a need for signalling optimization. Embodiments of the present invention may be applicable for/in any kind of modern and future communication network including any mobile/wireless communication networks/systems.

Example embodiments to be described below are not intended to limit the present invention to any specific example, embodiment, environment, applications, or particular implementations described in these example embodiments. It should be appreciated that, in the following example embodiments and the attached drawings are illustrated for the ease of understanding, but not to limit the actual scale.

The following paragraphs will describe various embodiments of the invention. For exemplary purposes only, most of the embodiments are outlined according to the LTE-Advanced mobile communication system with the solution to the problem discussed in the background. It should be noted that the invention may be advantageously used in connection with the communication system described above, but the invention is not limited to its use in this particular exemplary communication network. The explanations given below are intended to better understand specific exemplary embodiments described herein and should not be understood as limiting the invention to the specific implementations of processes and functions in a mobile communication network. The improvements/solutions proposed herein may be readily applied in architectures/systems having relevance to relay architectures. Some embodiments of the invention may also make use of standard and improved procedures of these architectures/systems.

The techniques described herein may be used for various wireless communication networks such as CDMA networks, CDMA implementing radio technology such as UTRA, TDMA networks, TDMA implementing radio technology such as GSM, FDMA networks, OFDMA networks, OFDDA implementing radio technology such as Evolved UTRA (E-UTRA), SC-FDMA networks.

User equipment (UE) used in the following description denotes various terminologies used like an access terminal (AT), wireless communication device, terminal, wireless handset, computer or wireless module, wireless module for use with a computer, personal digital assistant (PDA), tablet computer or device. In the overall architecture of a network with a relay node (RN), a relay node has a base station and a terminal side called as user equipment (UE). Towards UE the RN behaves as a conventional eNB using the access link (Uu interface) and the UE is not aware of whether it is communicating with a relay node or a base station. Relay nodes are therefore transparent for the UE. Towards base stations relay nodes initially operate as a UE using the radio interface to connect to the base station. Once connection is established and the relay node is configured, the relay uses a subset of the UE functionality for communication on the backhaul link (Un interface). In relay architecture Base station acts as a proxy between the core network and the relay node. From the relay perspective, it appears as if RN is directly connected to the core network and the Base station appears as a mobility management entity (MME) for the S1 interface and a base station (eNB) for X2 interface towards the relay node. From the perspective of core network, the relay node appears as it belongs to the Base station.

The UEs are connected to the RN by means of an Uu interface and the RN to the Base station by means of Un interface. When the network e.g., MME has no valid location or routing information for the UE, the UE cannot be reached. This is more likely when the UE is in a state of switched off, or out of coverage area. 3GPP defines this state as a de-registered state and this could also happen when the UE is in non-3GPP access. When the UE is attached to the network e.g., MME, it can receive Core Network services. This state is defined by 3GPP as registered state. In this registered state the UE can be in two different connection management states like RRC_IDLE state and RRC_CONNECTED state. When no data is being transmitted and the radio resources are released, the UE has a valid IP configuration. In such idle state there is no Non-Access Stratum (NAS) signalling connection between the UE and the network, e.g., MME. Also during the idle state there is no S1 connection between the eNB and the Serving Gateway. In the RRC_CONNECTED state, there is an active connection between the UE and Base station, which implies a communication context being stored within the Base station for this UE. Both sides can exchange user data and or signalling messages over logical channels.

From the wireless network perspective, protocol structure for the User and Control planes correspond to user data transmission and signalling transmission. Control plane corresponds to the information flows actually considered as signalling by E-UTRAN and Core Network. This includes all the RRC (Radio Resource Control) E-UTRAN signalling (supporting functions such as Radio Bearer management, radio mobility, user paging) and NAS (Non Access Stratum) signalling. On the radio interface, the Control plane uses the Control plane protocol stack namely PDCP (Packet Data Convergence Protocol), RLC (Radio Link Control), MAC (Medium Access Control) and PHY (Physical) stack to transport both RRC and Core Network NAS signalling. The above protocol stack layers support the same functions for both the User and Control Planes. When a Non-Access Stratum (NAS) signalling connection needs to be established between UE and the MME routed via relay node, the UE and the MME shall enter the connected state.

It should be noted that Base station is in fact connected to one or more than one MME or Serving GW node. These pluralities of Base station form a pool area such that a pool area can be served by one or several MME and/or Serving GW. A given MME or Serving GW node may serve one or several pool areas. The connectivity of the relay node and the UE communicating via relay node, is managed by the network e.g., MME. Based on initial NAS signalling, MMEs in the pool analyzes the request and determines which MME should manage the radio resources for the respective relay node or the UE communicating via relay node. This communication message essentially comprising of bearer request acknowledgement, indicates the uplink channel through which the UE is to communicate for establishing radio bearers. For the sake of simplicity MME managing the UE and the MME managing the RN is indicated as MME_UE and MME_RN respectively, hereinafter.

FIG. 1 shows the signalling message for bearer initiation procedure existing in 3GPP LTE specification. UE 20 sends an initial NAS message or service request to the MME_UE 101a, which is routed through RN 10 and Base station 30. When a NAS layer in the UE has to send an initial NAS message denoted as 'UE NAS Msg' in FIG. 1, the UE first initiates the establishment of the Radio Resource Control (RRC) connection over the Uu interface. The RRC procedures are elaborated in 3GPP specification TS 36.331 available at www.3gpp.org. In parallel to the establishment of the RRC connection over the Uu interface, the RN initiates the establishment of the RRC connection over the Un interface. The RRC connection establishment procedure over the Uu and Un interfaces are identical.

The NAS message is directed to MME (UE) 101a and the RN 10 is transparent. The MME_UE 101a understands the message and forwards it to the SGW/PGW_UE 102a for checking the UE subscription data. Then the SGW/PGW_UE 102a in conjunction with PCRF (not shown) authorizes MME_UE 101a to create a dedicated bearer and sends the message over S11 interface (Interface between S/PGW and MME). On receiving the response, MME_UE 101a sends bearer setup request to the UE 20 as an S1-AP message routed through RN 10. RN 10 understands this S1-AP message and initiates RRC configuration between UE 20 and RN 10. A bearer setup response is then sent by UE 20 to MME_UE 101a routed via RN 10 and Base station 30 as an S1-AP message. On receiving the response from UE 20, MME_UE 101a establishes the bearers and sends the response to SGW/PGW_UE 102a. This process establishes radio bearers to enable data flow from the SGW/PGW_UE 102a to the UE 20. After completion of this procedure, the RN 10 may send a NAS message seeking bearer-resource request to MME_RN 101b through Base station 30. MME_RN 101b understands the message and provisions bearer resource allocation to RN 10. Upon receiving bearer resource allocation, RN 10 bearer establishment is completed. Radio resources for the relay node 10 are allocated so as to serve the already established UE's bearer requirements. The above process of initiating bearer establishment can also be initiated by EPC/Core Network. This happens both when the UE 20 is in the RRC_IDLE state and a message/data is to be transported to the UE 20 by the Core Network or when there is a change in existing bearer configuration to the UE 20 in the RRC_CONNECTED state. In this state, MME_UE 101a initiates bearer-setup or modify procedure for the UE 20 at any point of time based on UE subscription and QoS requirements. Thus in all the above instances of UE NAS Messages, whenever a UE 20 bearer is created or modified, the RN bearer, modify or create may be initiated subsequently by the RN 10. Thus additional messages are exchanged separately for the UE 20 and for the RN 10 to modify/create a new bearer. This either wastes or underutilizes the backhaul bandwidth. Further, there is delay in traffic flow.

Figure 2:
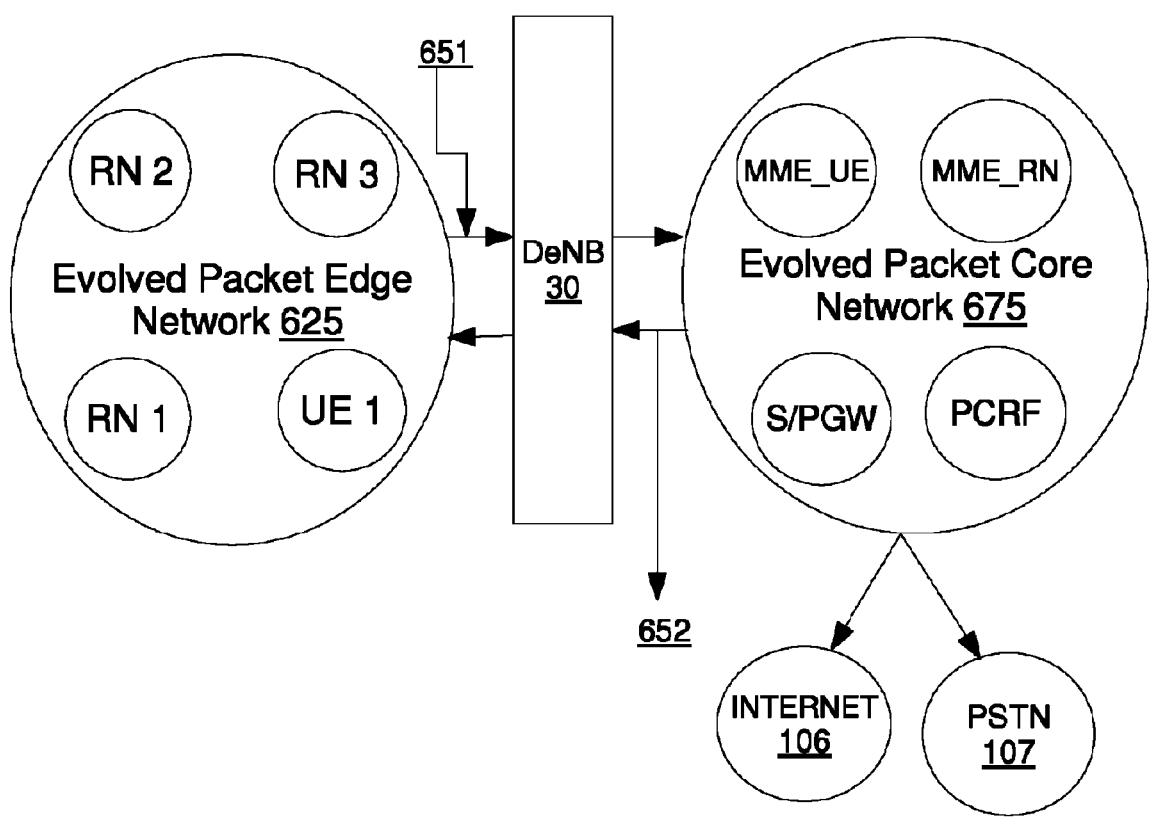
FIG. 2 shows the network nodes conglomeration between two network entities in accordance with the principles of the invention.

FIG. 2 shows the network nodes conglomeration between two network entities in accordance with the principles of the invention. Network entity 625 is called as Evolved Packet Edge (EPE) comprising of plurality of network nodes like UE, RN and all other nodes that communicate with Evolved Packet Core Network entity 675 via Base station 30. Network nodes in the EPE 625 may establish connectivity external to EPC like Internet 106 or PSTN (Public Switch Telephone Network) 107. EPC entity 675 comprises of network nodes like Mobility Management Entity (MME), Serving gate way/Packet gate way (S/PGW), Policy of Charging Rules Function etc., These nodes essentially manages the entities in the EPE. For e.g., a UE bearer resource request is processed and allowed only by the MME serving the UE. Depending on the complexity of the communication network, it so happens that, MMEs are segregated to perform management of plurality of UE and RN separately. In such cases, it is appropriate to indicate MMEs serving the UEs as MME_UE and MMEs serving the RNs as MME_RN.

As part of bearer management signalling as envisaged, a communication from EPE 625 comprising of bearer resource request of both the UE and RN is transported via Base station 30 to EPC as a single signalling message over uplink channel 651 hereinafter referred to as "Union of Resource Request" (UR Request) message.

The response message comprising of bearer resource response from either one of the managing entity or managing entities of EPC 675 are transported as a single signalling message to Base station 30 over the downlink channel 652 hereinafter referred to as "Independent Admission Response" (IA Response). This manages bearer setup signalling loop, with a single transportation of 'UR Request' signalling message and receiving "Independent Admission Response" signalling message over uplink and downlink channels respectively.

Figure 3:
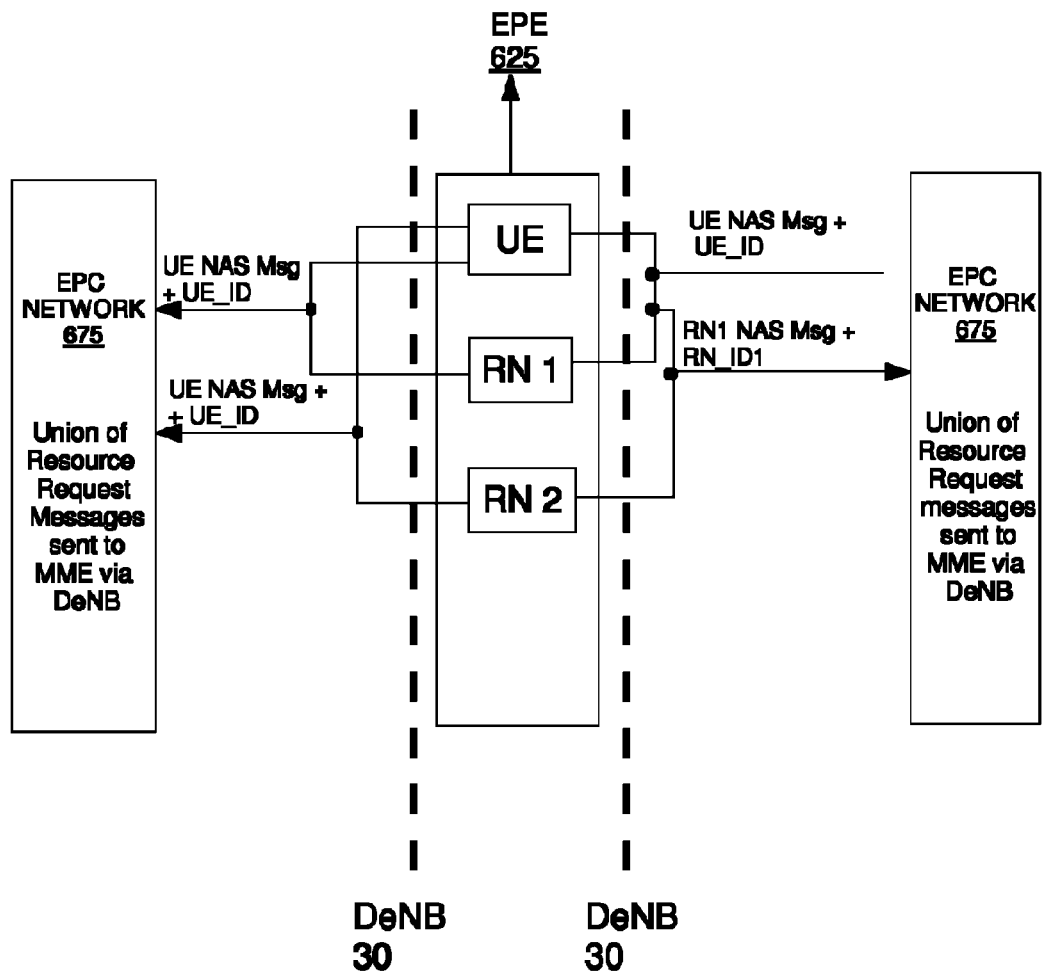
FIG. 3 represents 'UR Request' message signalling in the uplink from Evolved Packet Edge to Evolved Packet Core via Base station in accordance with the embodiments of the invention.

FIG. 3 represents "UR Request" message signalling in the uplink from EPE to EPC 675 via Base station 30 in accordance with the embodiments of the invention. When the UE 20 is in the state of RRC_CONNECTED or RRC_IDLE; a UE NAS signalling message requesting bearer resource of the form 'Create, Update, Detach, Modify' etc., hereinafter referred to as "CRUD" messages, are generated. It so happens that, depending on the complexity of the EPE communication network, multiple relay nodes may be wirelessly connected in a sequence so as to serve a distant UE. In such cases, a bearer request of a UE initiated by sending a UE NAS message to the MME in the EPC 675 has to be routed via all the relay nodes acting in sequence. Such an arrangement is shown towards the right of EPE 625.

The UE NAS message generated by UE 20 is received at the first upstream relay node (RN). The first relay node encapsulates the said received UE NAS message in the RN1 NAS message by adding the identity of UE (UE_ID). The RN1 NAS message thus created by first relay node is received by the second upstream relay node, which encapsulates the said received RN1 NAS message in its RN2 NAS message by adding the identity of the downstream relay node (RN1_ID) as this RN is the UE for the upstream relay node. Relay node identity or RN_ID is a unique identifier that uniquely identifies the MME serving the said RN. Relay node identity comprises of MME Group ID, MME code of MME_RN. The encapsulated RN2 NAS message is referred to as tagged message (UE_TAG) and represented as "UR Request". Similar tagging is done for any number of such upstream relay nodes. The above said tagged message is forwarded to the managing entity of RN within EPC 675 via Base station 30. The tagged message is available at the MME_RN within EPC as "UR Request" message.

In case of a single relay node, encapsulated 'RN NAS message with UE_ID' forms the tagged message. Depending on the mobility of the UE within EPE of a communication network, it so happens that, a single UE may be connected to different relay nodes. Such circumstances may arise based on the mobility of the UE and/or proximity of the UE with a RN exhibiting excellent signal strength. In such cases, a bearer request of a UE initiated by sending a UE NAS message to the MME in the EPC 675 has to be routed through the respective RN which is coupled to the UE. Such an arrangement is shown towards the left of EPE 625.

Figure 4:
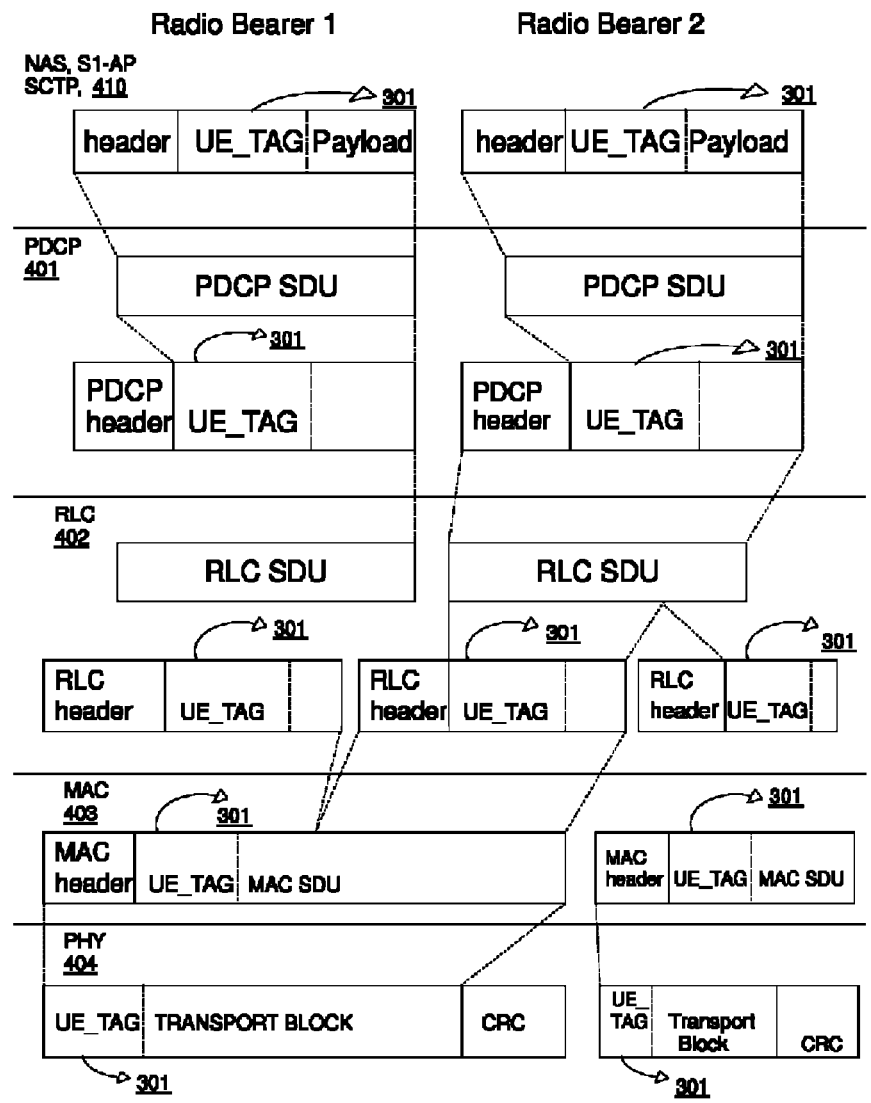
FIG. 4 shows a detailed method of tagging (UE_TAG) in any one of the control plane protocol layers in accordance with the embodiments of the invention.

FIG. 4 depicts protocol layers through which insertion of UE_TAG (comprising of UE_ID and type prefix for the said UE_ID) by the RN 10 preferably at NAS layer or any one of the control plane protocol layers of S1-AP, SCTP, PDCP, RLC, MAC, PHY, is accomplished in accordance with the embodiments of the invention. For the sake of illustration the flow of uplink signalling data in case of two radio bearers is shown with possible UE_TAG insertion points, at any one of the protocol layers. For the sake of brevity, the control plane protocol layer 410 above PDCP layer 401 is shown as an integrated layer comprising of NAS, S1-AP, and SCTP (Stream Control Transmission Protocol).

The PDCP layer 401 performs IP-header compression and ciphering. A PDCP header is added, carrying information required for deciphering in the UE. The output from the PDCP is forwarded to the RLC layer 402. The RLC protocol performs concatenation and/or segmentation of the PDCP Service Data Units (SDUs) and adds an RLC header. The RLC Service Data Units (PDUs) are forwarded to the MAC layer 403, which multiplexes a number of RLC SDUs and attaches a MAC header to form a transport block. Finally the Physical layer 404 attaches a CRC (Cyclic Redundancy Check) to the transport block for error-detection purposes and transmits the resulting signal using transmit antennas. In the above protocol structure, possible insertion of UE_TAG 301 (shown by arrow headers) could be any one of the layers. For e.g., UE_TAG 301 can be preferably inserted at header junction of layer 410, or at PDCP header junction of layer 401, or at RLC header junction of layer 402 or at MAC header junction of layer 403 or at any junction of the PHY layer 404. Similarly for each radio bearer signalling flow a possible UE_TAG 301 could be inserted at any one of the protocol layers as explained above.

Figure 5:
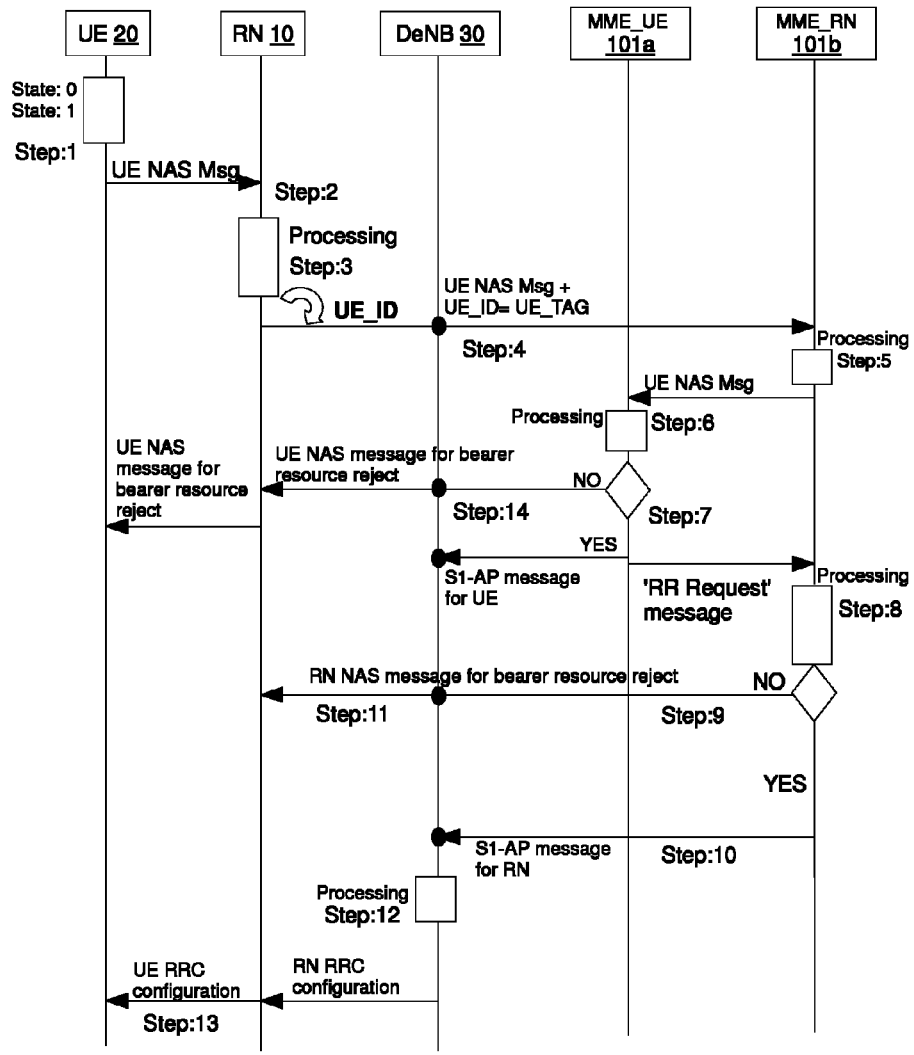
FIG. 5 represents bearer establishment signalling loop in accordance with various aspects of the invention.

FIG. 5 represents bearer setup signalling loop, with a single transportation of "UR Request" signalling message by EPE entities and receiving "Independent Admission Response" signalling message by Base station over uplink and downlink channels respectively, in accordance with the embodiments of the present invention. For the sake of simplicity, UE coupled with one RN is shown. When the UE 20 is in the state of RRC_CONNECTED (1) or RRC_IDLE (0), (Step 1) CRUD messages are generated by UE or initiated by EPC. In either case, UE 20 generates either single or multiple bearer resource requests within a single NAS message thereby triggering the establishment of RRC connection with the RN 10 in case UE is in RRC_IDLE (0) mode. RN 10 also starts the establishment of the RRC connection with the Base station 30 in case RN is in RRC_IDLE (0) state. Both these RRC procedures over the respective Uu and Un interface are elaborated in 3GPP specification TS 36.331.

When the RN 10 receives the UE NAS Message (Step 2), relay node encapsulates the said received UE NAS message in the RN NAS message by adding the identity of UE (UE_ID) (Step 3) to be sent to the MME_RN 101*b* via Base station 30. Without loss of generality the denotation 'UE NAS Msg+UE_ID' will be called as 'UE_TAG' which means that it is a tagged message essentially consisting of UE NAS Message with UE_ID (Step 4). The above denotation is specifically defined for the purpose of this invention as a tagged message denoted as UE_TAG. In the case of multiple relay nodes upstream (For e.g., RN1 and RN2), the first upstream relay node RN1 encapsulates the said received UE NAS message in the RN1 NAS message by adding the identity of UE (UE_ID) at any one of the control plane protocol layers S1-AP, SCTP, PDCP, RLC, MAC, PHY preferably over NAS. The RN1 NAS message thus created by first relay node is received by the second upstream relay node RN2, which encapsulates the said received RN1 NAS message in its RN2 NAS message by adding the identity of the downstream relay node (RN1_ID) as this RN is the UE for the upstream relay node. The encapsulated RN2 NAS message is referred to as tagged message (UE_TAG) and represented as "UR Request". Similar tagging is done for any number of such upstream relay nodes The UE_TAG is then transmitted from the RN 10 to the MME_RN 101*b* via Base station 30 over Un interface as a control plane signalling message. When this UE_TAG arrives at Base station 30, Base station 30 understands the message to be a 'UE_TAG' message except when tagged at NAS layer, and then forwards it to MME_RN 101*b*; the MME_RN 101*b*, understands the message and if the tagged message is not a "UR Request" message it treats as 'other control plane signalling message'. If the tagged message is a CRUD message then the MME_RN 101*b* de-capsulates UE 20 NAS message and forwards the request to MME_UE 101*a* using the identity of UE. In case of multiple relay nodes, the RN2 NAS message received by the Base station from the downstream relay node is forwarded to the mobility management entity serving the said downstream relay node (MME_RN2). The said MME_RN2 understands the received RN2 NAS message and de-capsulates the message and forwards the RN1 NAS message if found, within the said received RN2 NAS message to the mobility management entity serving the said relay node (MME_RN1) based on the identity of relay node. MME_RN1 understands the received RN1 NAS message and de-capsulates the 'UE NAS message' if found, and forwards the 'UE NAS message' along with the identity of MME_RN2 and any other MME_RN identities which are in the sequence of receiving the RN NAS message to MME_UE based on the UE identity inside RN1 NAS message (Step 5). The thumb rule for providing the identities of MME_RN to next node is that, identities of all MME_RNs via which the message has traversed except the identity of the node which is forwarding the message shall be provided to the next MME node.

When the UE NAS message is received and understood by the MME_UE 101a to be a bearer resource request message (Step 6), MME_UE 101a grants utmost UE request and generates 'S1-AP message for UE' and relay node resource request (RR request) message for granted resources by MME_UE (Step 7). The above messages are forwarded to Base station 30 and MME_RN 101b respectively. In case of multiple relay nodes in sequence, MME_UE 101a generates relay node resource request (RR request) messages for granted resources by MME_UE, for MME_RNs identified by MME_RN identities and forwards it to the respective MME_RNs. If the MME_UE 101a finds that the UE NAS Message does not pertain to UE 20 bearer request, then the received message is handled as 'other control plane signalling message' and if the MME_UE 101a does not grant UE 20 bearer request at step 7, then MME_UE 101a generates 'UE NAS message for bearer resource reject' and forwards it for UE 20 via Base station 30 (Step 14).

The 'RR Request' message generated by the MME_UE 101a for MME_RN 101b is a bearer request on behalf of RN 10. The message essentially is an establishment of RN bearer to serve UE bearer QoS requirements. (For e.g., the 'RR Request' message may be that, some bandwidth is guaranteed for the UE 20 which is being served by the RN 10 (RN_ID). Hence MME_RN 101b is required to process RN 10 bearer request. The 'RR Request' is then forwarded to MME_RN 101b. MME_RN processes the 'RR Request' forwarded by MME_UE (Step 8). Once RN 10 bearer request is granted, MME_RN 101b generates 'S1-AP message for RN' (Step 10) and forwards to the Base station 30 directly. If the MME_RN 101b does not grant 'RR Request' made by MME_UE 101a at Step 8, then MME_RN 101b generates 'RN NAS message for bearer resource reject', and then forwards it to Base station 30 (Step 9). In case of multiple relay nodes, the generated 'S1-AP message for RNs' comprises of bearer resource allocation message for all the relay nodes. Base station 30 processes the received 'S1-AP message for RN' (Step 12) and performs RRC configuration for the downstream relay node and forwards 'S1-AP messages' for the remaining EPE entities. Performing RRC configuration for the downstream relay node by Base station at Step 11 and Step 12 and performing RRC configuration by relay node to the subsequent downstream relay nodes or performing RRC configuration by the first upstream relay node to the UE (Step 13) are similar to those functions elaborated in 3GPP specification The 'S1-AP message for UE' and 'S1-AP message for RN or RNs at step 7 and step 10 are available to Base station 30 as "Independent Admission Response" (IA Response) messages. "Independent Admission Response" comprises of bearer resource allocation message pertaining to the respective EPE entities. For e.g., if MME_UE grants bearer resource (x) to the UE (Y), it generates an 'S1-AP message for UE' and forwards to Base station which may be in the form of Y(x) and then generates 'RR Request' message seeking bearer allocation for the relay nodes (P,Q,R) and forwards to the respective MME_RNs. The 'RR Request' message may be in the form of Yx(P,Q,R). MME_RNs may grant the same resources ('x') to the respective relay nodes (P, Q, R). In such cases MME_RNs may generate 'S1-AP message for RNs' which may be in the form of x(P,Q,R) and forwards it to Base station. The "Independent Admission (IA) Response" from MME_UE i.e., Y(x), is understood by the Base station as a message comprising of allocated bearer resources corresponding to the value of 'x' to UE. "Independent Admission Response" from MME_RNs i.e., x(P,Q, R) is understood by the Base station as a message comprising of allocated bearer resources corresponding to the value of 'x' for the relay nodes 'P', 'Q' and 'R' respectively. In the above given example, in case MME_RNs grants bearer resources for each relay node P,Q,R, corresponding to the value less than the granted value of UE i.e., 'x-a', then the 'S1-AP message for RNs' would be in the form '(P,Q,R)(b, b,b)', (where x-a=b). When this "IA Response" message is received by Base station, it understands as a message comprising of allocated bearer resources corresponding to the value of 'b' for the respective relay nodes 'P', 'Q' and 'R'. Further, in the above given example, in case MME_RN managing the relay node 'P' grants bearer resources corresponding to the value less than the granted value of UE i.e., 'x-d'; and MME_RN managing the relay node 'Q' grants bearer resources corresponding to the value less than the granted value of RN 'P' i.e., 'x-e'; and MME_RN managing the relay node 'R' grants bearer resources corresponding to the value less than the granted value of RN 'Q' i.e., 'x-f' wherein (f<e<d), then the "IA Response" message that is generated by MME_RNs would be '(P(d),Q(e),R(f))'. When this "IA Response" is received by the Base station, it understands it as a message comprising of allocated bearer resources corresponding to the value of 'd' for 'P', 'e' for 'Q', and 'f' for 'R'. In the given example, in case MME_RN grants bearer resources for the relay node 'P' corresponding to the value 'g'; grants bearer resources for the relay node 'Q' corresponding to the value 'h'; and denies granting any of the bearer resources for the relay node 'R', then the "IA Response" message that is generated by MME_RN would be 'P(g), Q(h), R( )' comprising of 'S1-AP messages' for the granted relay nodes (P and Q) and 'RN NAS message for bearer resource reject' to the relay node (R). When this "IA Response" is received by the Base station, it understands as a message comprising of allocated bearer resources corresponding to the value of 'g' for 'P', 'h' for 'Q' and 'RN NAS message for bearer resource reject' for 'R'.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be noted that respective functional blocks or elements according to above-described aspects can be implemented by any known means, either in hardware and/or software, respectively, if it is only adapted to perform the described functions of the respective parts. The mentioned method, steps can be realized in individual functional blocks or by individual devices, or one or more of the method, steps can be realized in a single functional block or by a single device.

The present invention also covers any conceivable combination of method steps and operations described above, and any conceivable combination of nodes, apparatuses, modules or elements described above, as long as the above-described concepts of methodology and structural arrangement are applicable. It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method for bearer management signalling in a communication network, the method comprising:
   receiving a union of resource (UR) request message from an evolved packet edge (EPE), wherein the EPE includes user equipment (UE) and a relay node (RN);
   wherein receiving the UR request message from the EPE comprises receiving the UR request message via a base station to a managing entity associated with the RN within an evolved packet core (EPC), wherein the managing entity comprises a plurality of mobility management entities (MMEs) configure to manage one or more relay nodes (RNs), wherein the managing entity further comprising a serving gate way, a packet gate way, and a policy of charging rules function (PCRF); and
   sending an independent admission (IA) response to the UR request to the UE, wherein sending the IA response comprises determining one of the plurality of MMEs to serve the UE, and forwarding the IA response via the base station for the UR request from determined one of the plurality of MMEs, wherein the management entity is configured to manage all entities in the EPE.

2. The method of claim 1, wherein receiving the UR request message comprises receiving the UR request message over a radio resource control (RRC) connection.

3. The method of claim 1, further comprising:
   forwarding the received UR request message to a serving gateway node to validate a subscription information of the UE.

4. The method of claim 1, wherein the UR request comprises an union of a bearer resource request from the UE and the RN.

5. The method of claim 1, wherein receiving the UR request message comprises receiving the UR request message from the UE when the UE is in a radio resource control (RRC) connected or a RRC idle mode.

6. The method of claim 1, wherein receiving the UR request comprises receiving the UR request as a UE non-access stratum (UE NAS) message.

7. The method of claim 1, wherein receiving the UR request comprises receiving an UE identifier (UE-ID) in the UR request message.

8. A method for bearer management signalling in a communication network, the method comprising:
   receiving a bearer resource request message from a user equipment (UE) at a relay node (RN) in an evolved packet edge (EPE), wherein the EPE comprises the UE, the RN, and at least one base station, and wherein receiving the bearer resource request message comprises receiving a user equipment non-access stratum (UE NAS) message;
   encapsulating, by the relay node, the received UE NAS message in a relay node non-access stratum (RN NAS) message to form a union of resource (UR) request message;
   transporting the UR request message from the EPE via a base station to a managing entity of relay nodes (RNs) within an evolved packet core (EPC), wherein the managing entity of RNs are network nodes that manage RNs and comprises at least one of the following: a mobility management entity serving the relay node (MME_RN), a serving gate way node, a packet gate way node, a policy of charging rules function (PCRF); and
   receiving an independent admission (IA) response from the base station for the transported UR Request, wherein the base station is configure to receive the IA response from the management entities of EPE within.

9. The method of claim 8, wherein receiving the bearer resource request comprises receiving the bearer request message from the user equipment in an RRC idle mode.

10. The method of claim 8, wherein encapsulating, by the relay node, the received UE NAS message in a relay node non-access stratum (RN NAS) message further comprises tagging a user equipment identifier (UE_ID) in the union of resource request message.

11. A bearer management signalling system for a relay node in a communication network comprising:
    a receiver for receiving a user equipment non-access stratum (UE NAS) Message, wherein the UE NAS message is received as a S1-AP message from an user equipment (UE);
    a processor configured to tag the received UE NAS message, wherein tagging the received NAS message comprises adding a user equipment identity (UE_ID) with the received NAS message;
    wherein the processor is further configured to construct a relay node non-access stratum (RN NAS) message by encapsulating the received UE NAS message along with a tag comprising the UE_ID;
    a transmitter for transmitting the RN NAS message towards a managing entity via a base station;
    wherein processor is further configured to receive an independent admission (IA) response from the base station and perform a radio resource control (RRC) configuration based on the IA response, wherein the base station is configured to receive the IA response from a management entity comprising at least one of: a mobility management entity serving the relay node (MME_RN), a serving gate way node, a packet gate way node, a policy of charging rules function (PCRF) ; and
    wherein the transmitter is further configured to transmit a RRC radio bearer configuration message to EPE entities and the UE.

12. The bearer management signalling system of claim 11, wherein the processor is further configured to create a union of resource (UR) request comprising a bearer resource request from each of the UE and the RN.

13. The bearer management signalling system of claim 11, wherein the relay node is transparent to the user equipment.

14. The bearer management signalling system of claim 11, wherein the user equipment is in a service range of the relay node and the base station.

* * * * *